(12) United States Patent
Aiba et al.

(10) Patent No.: US 10,974,425 B2
(45) Date of Patent: Apr. 13, 2021

(54) MOLD APPARATUS

(71) Applicant: SODICK CO., LTD., Kanagawa (JP)

(72) Inventors: Shuji Aiba, Kanagawa (JP); Satoru Inoue, Kanagawa (JP); Yasuhiro Kitamura, Kanagawa (JP)

(73) Assignee: SodickCo., Ltd., Kanagawa (JP)

( * ) Notice: Subject to any disclaimer, the term of this patent is extended or adjusted under 35 U.S.C. 154(b) by 43 days.

(21) Appl. No.: 16/382,218

(22) Filed: Apr. 12, 2019

(65) Prior Publication Data

US 2019/0315033 A1    Oct. 17, 2019

(30) Foreign Application Priority Data

Apr. 17, 2018 (JP) .............................. JP2018-078849

(51) Int. Cl.
| | | |
|---|---|---|
| *B29C 45/26* | (2006.01) | |
| *B29C 45/27* | (2006.01) | |
| *B29C 33/30* | (2006.01) | |
| *B29C 45/40* | (2006.01) | |

(52) U.S. Cl.
CPC ........ *B29C 45/2675* (2013.01); *B29C 33/306* (2013.01); *B29C 45/2602* (2013.01); *B29C 45/2703* (2013.01); *B29C 45/401* (2013.01)

(58) Field of Classification Search
CPC .................. B29C 45/27; B29C 33/306; B29C 2045/4078; B29C 45/2675; B29C 45/2673; B29C 45/2602; B29C 45/2701
See application file for complete search history.

(56) References Cited

U.S. PATENT DOCUMENTS

| 5,662,952 A | * | 9/1997 | Den Uyl | ................. B29C 45/38 |
|---|---|---|---|---|
| | | | | 425/556 |
| 2018/0126614 A1 | | 5/2018 | Inoue et al. | |

FOREIGN PATENT DOCUMENTS

| JP | S6245115 | 3/1987 |
|---|---|---|
| JP | H04022414 | 4/1992 |
| JP | H05009137 | 3/1993 |
| JP | H08197584 | 8/1996 |
| JP | 2002096355 | 4/2002 |
| JP | 6164715 | 7/2017 |

OTHER PUBLICATIONS

Partial machine translation of Kamio et al JPH08197584A dated Aug. 6, 1996 obtained from the espacenet website. (Year: 1996).*
"Office Action of Japan Counterpart Application", dated Oct. 24, 2018, with English translation thereof, p. 1-p. 8.
"Office Action of China Counterpart Application", dated Nov. 4, 2020, with English translation thereof, pp. 1-12.

\* cited by examiner

*Primary Examiner* — Robert B Davis
(74) *Attorney, Agent, or Firm* — JCIPRNET

(57) ABSTRACT

A mold apparatus includes first and second mold plates that constitute a cassette mold, a first base mold, a base intermediate mold for loading the first mold plate, a second base mold for loading the second mold plate, a base intermediate mold driving device for positioning and fixing the base intermediate mold at any position between the first and second base molds, and a controller for performing control to position and fix the base intermediate mold so that the first mold plate and the first base mold are in contact with each other when a molded product is taken out.

7 Claims, 8 Drawing Sheets

MOLD APPARATUS

CROSS-REFERENCE TO RELATED APPLICATION

This application claims the priority benefit of Japan application serial no. 2018-078849, filed on Apr. 17, 2018. The entirety of the above-mentioned patent application is hereby incorporated by reference herein and made a part of this specification.

BACKGROUND

Technical Field

The disclosure relates to a mold apparatus. Particularly, the disclosure relates to a cassette type mold apparatus.

Description of Related Art

There is a conventional cassette type mold apparatus, which includes a base mold and a cassette mold, as disclosed in Patent Document 1. The base mold has a fixed base mold and a movable base mold, and the cassette mold can be loaded into the base mold. In addition, according to the mold structures, cassette molds are roughly divided into a two-plate mold and a three-plate mold. The two-plate mold includes a fixed mold plate and a movable mold plate while the three-plate mold includes a fixed mold plate, a movable mold plate, and a runner stripper plate.

In terms of a two-plate mold, the space between the fixed mold plate and the movable mold plate is opened, and the molded product is taken out from the gap between the two mold plates. In the case of a cold runner system, the sprue runner is taken out in addition to the molded product. However, in terms of a three-plate mold, the molded product and the sprue runner are taken out from the gap between the fixed mold plate and the movable mold plate and from the gap between the fixed base mold or the movable base mold and the runner stripper plate respectively. Although the three-plate mold has a degree of mold opening larger than that of the two-plate mold, the molding machine on which the mold apparatus is mounted has a maximum degree of mold opening in terms of structure. For the above reasons, conventionally, the base mold that can be used is restricted by the configuration of the cassette mold.

RELATED ART

Patent Document(s)

Patent Document 1: US2018126614A1

SUMMARY

In view of the above, the disclosure provides a mold apparatus that is capable of loading cassette molds of more types of structures regardless of whether the loaded cassette mold is a two-plate mold or a three-plate mold. Additional objects and advantages of the disclosure will be set forth in the description that follows.

Means for Solving the Problems

According to the disclosure, a mold apparatus is provided, which includes a first base mold; a sprue bush provided in the first base mold and formed with at least a part of a sprue flow path to which a molding material is supplied; a first mold plate formed with a runner flow path through which the molding material supplied from the sprue flow path flows, a gate through which the molding material supplied from the runner flow path flows, and a part of a cavity space which is filled with the molding material supplied from the gate and in which a molded product is molded; a base intermediate mold loaded with the first mold plate; a second mold plate formed with a part of the cavity space; a second base mold loaded with the second mold plate and relatively moving in a mold opening/closing direction with respect to the first base mold; a base intermediate mold driving device positioning and fixing the base intermediate mold at any position between the first base mold and the second base mold; and a controller controlling the base intermediate mold driving device to position and fix the base intermediate mold so that the first mold plate and the first base mold are in contact with each other when the molded product is taken out.

Effects

Since the base intermediate mold driving device can position and fix the base intermediate mold loaded with the first mold plate at any position between the first base mold and the second base mold, it is possible to use cassette molds of more types of structures in the mold apparatus of the disclosure.

DESCRIPTION OF THE EMBODIMENTS

Figure 1:
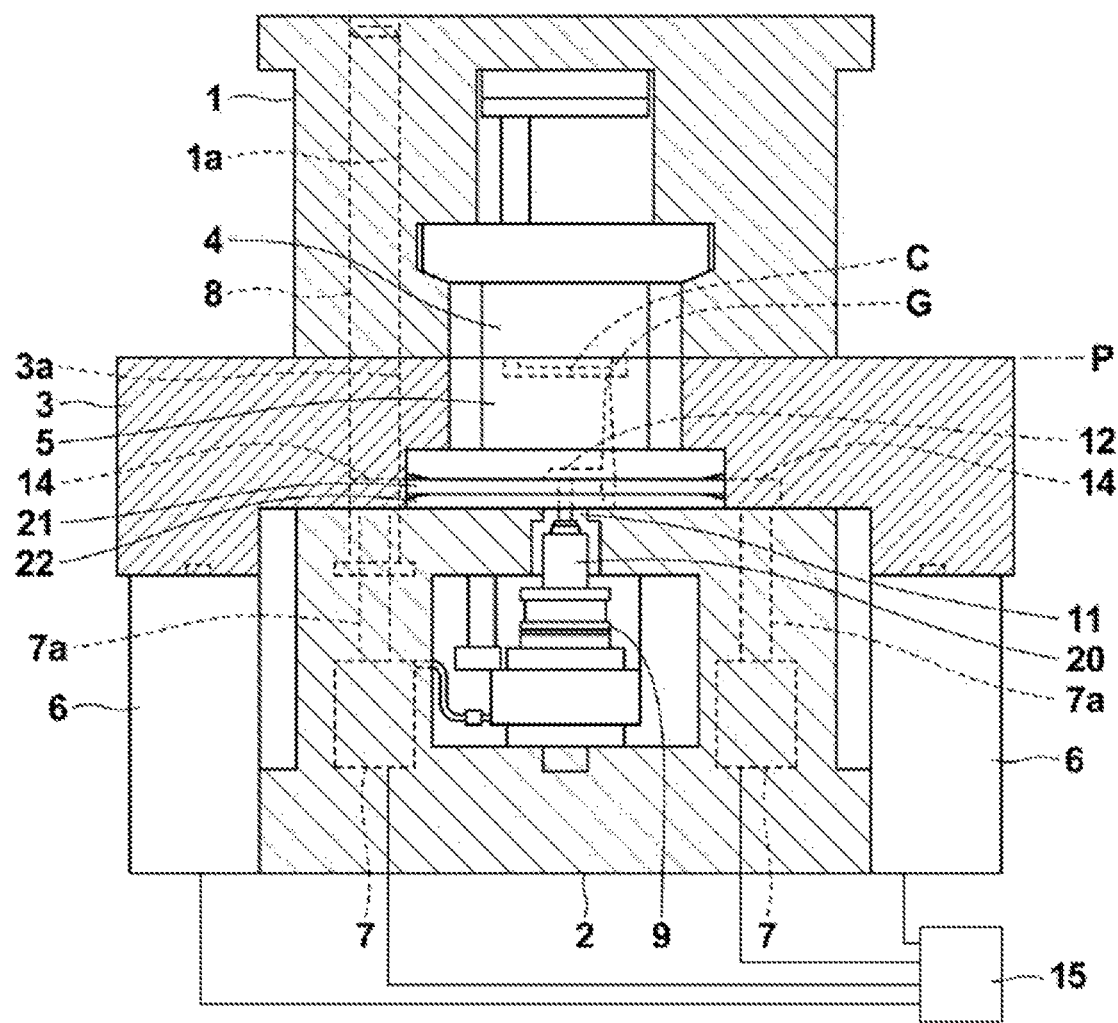
FIG. 1 is a partially cutaway side view showing the mold apparatus of an embodiment of the disclosure in a mold closed state.

An embodiment of the disclosure will be described in detail below with reference to the drawings. A mold apparatus 10 of the present embodiment is configured with the side where a molding material is supplied as the fixed side. In other words, the aforementioned first base mold corresponds to a fixed side base mold 2, the first mold plate corresponds to a fixed mold plate 5, the second base mold corresponds to a movable side base mold 1, and the second mold plate corresponds to a movable mold plate 4.

The mold apparatus 10 shown in FIG. 1 to FIG. 4 includes the fixed side base mold 2, the movable side base mold 1, and a base intermediate mold 3 disposed between the fixed side base mold 2 and the movable side base mold 1. The fixed side base mold 2 and the movable side base mold 1 are respectively fixed to a fixed platen and a movable platen in a mold clamping apparatus of a molding machine (not shown). The movable side base mold 1 is movable by the movable platen in a mold opening/closing direction, that is, a direction of moving close to or away from the fixed side base mold 2 (the vertical direction in FIG. 1 to FIG. 4).

Figure 4:
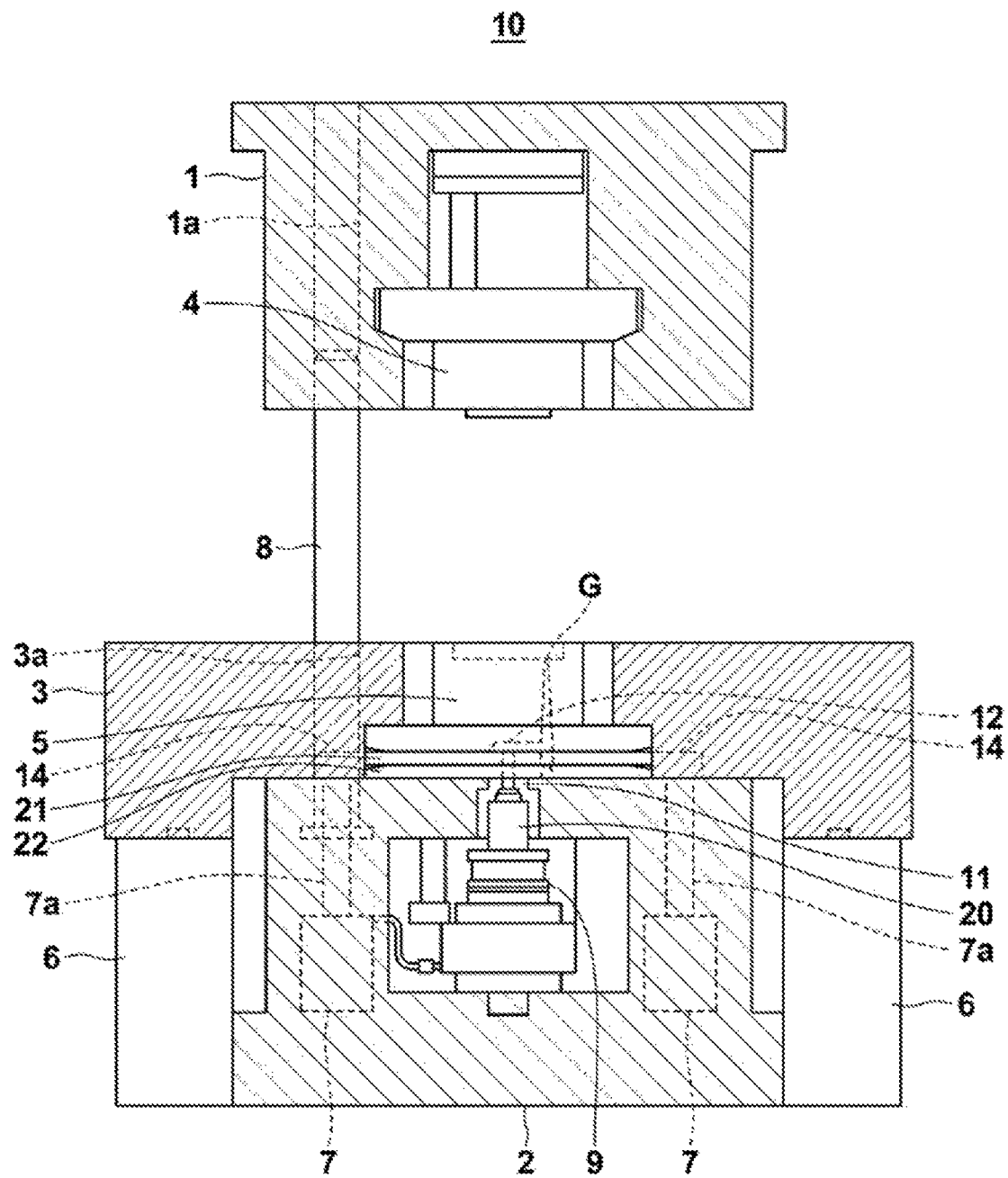
FIG. 4 is a partially cutaway side view showing the mold apparatus of an embodiment in a state where the molded product is taken out.
Figure 5:
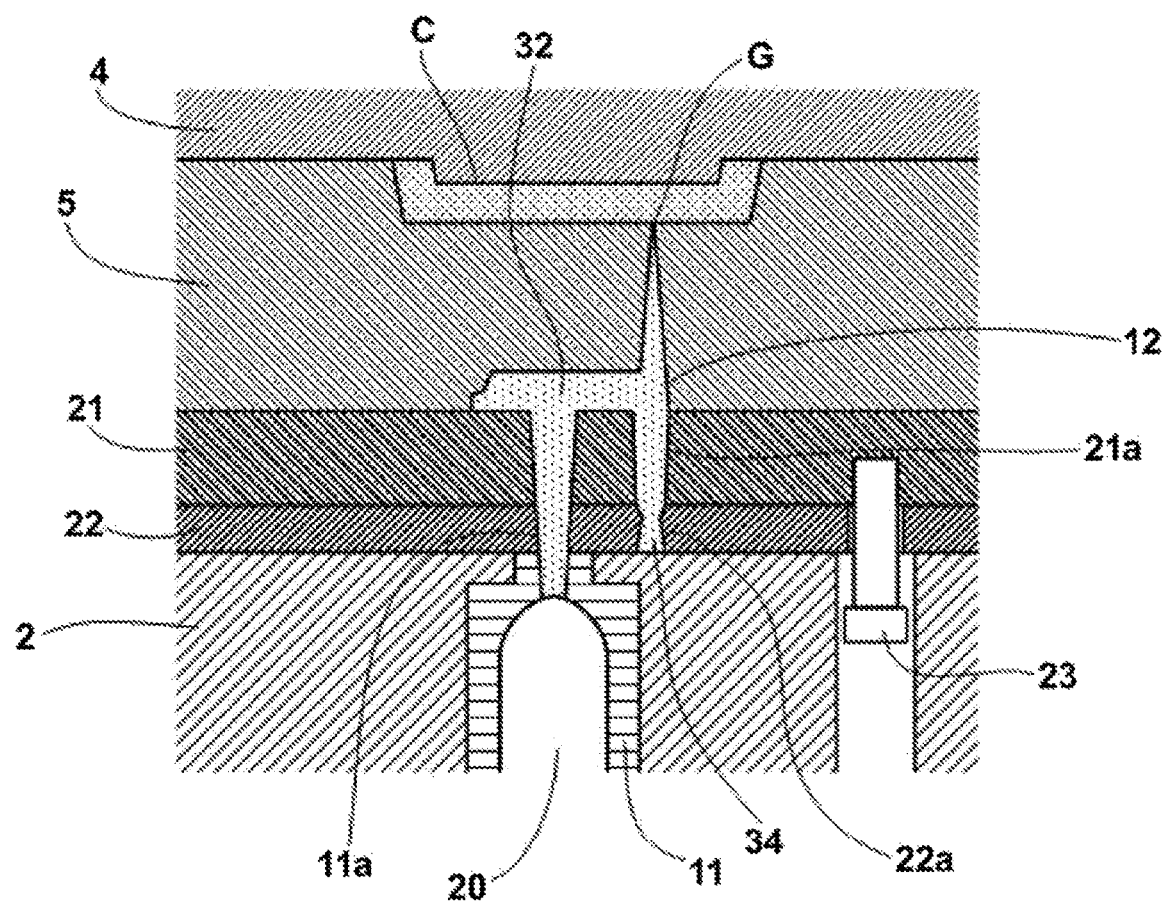
FIG. 5 is an enlarged side cross-sectional view of the area around the sprue runner of FIG. 1.
Figure 6:
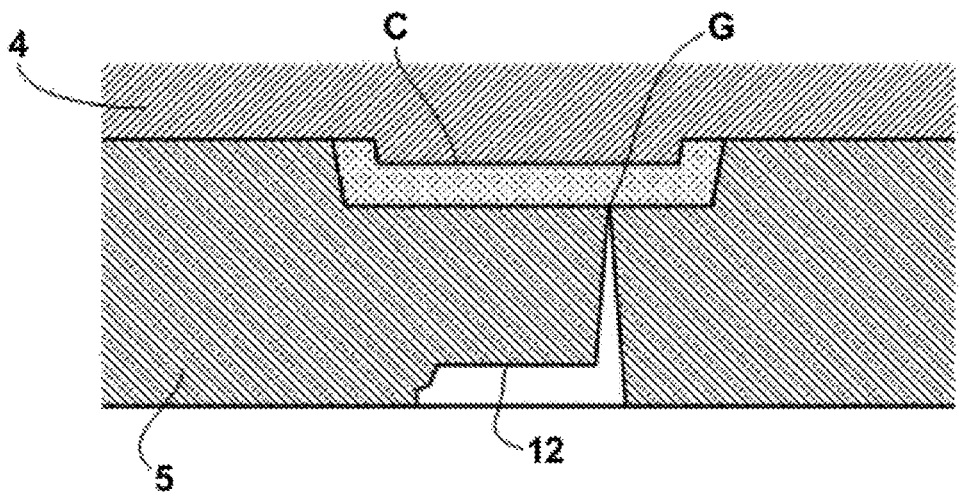
FIG. 6 is an enlarged side cross-sectional view of the area around the sprue runner of FIG. 2.
Figure 6:
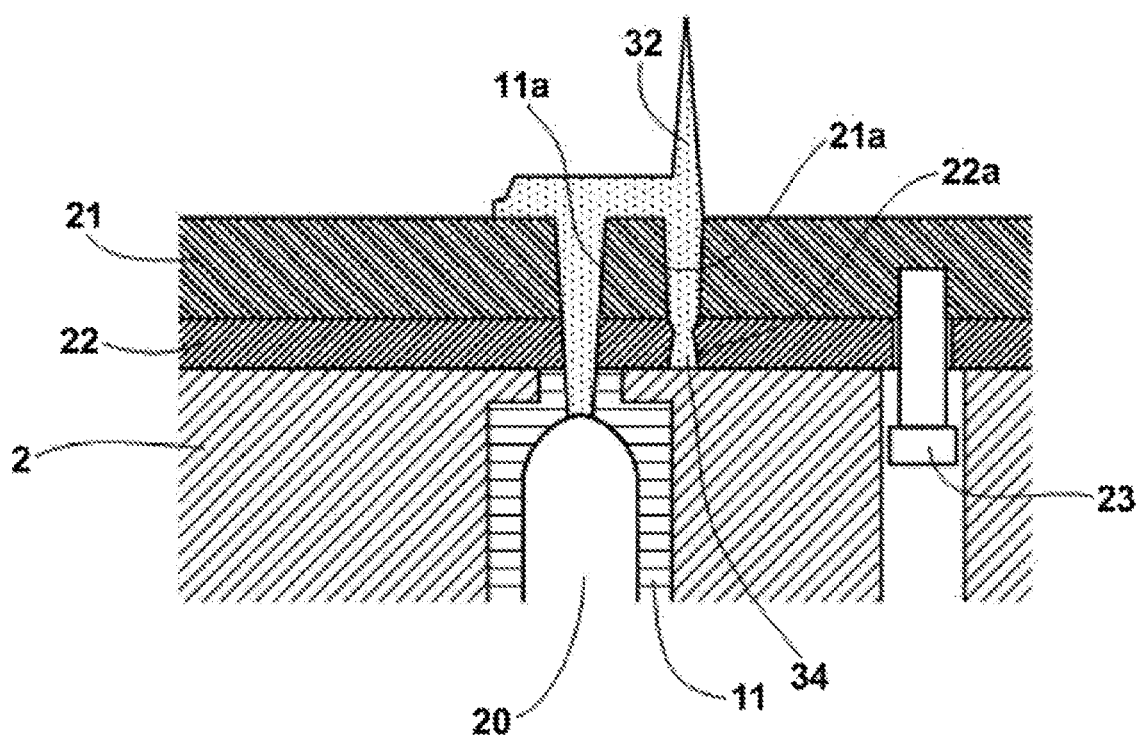
Figure 7:
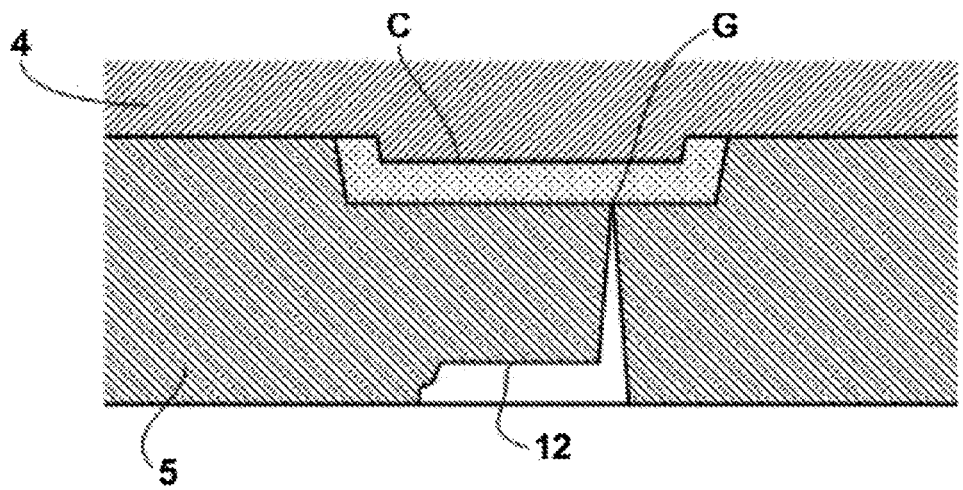
FIG. 7 is an enlarged side cross-sectional view of the area around the sprue runner of FIG. 3.
Figure 7:
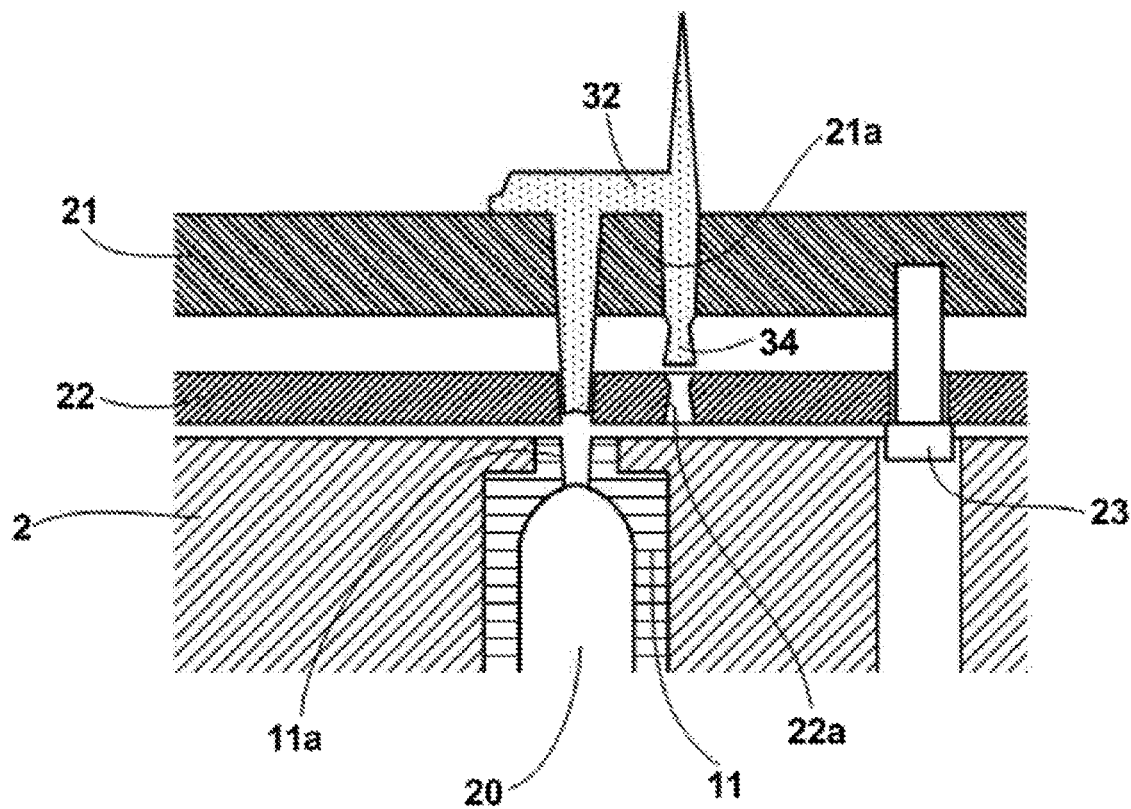

The fixed side base mold 2 is provided with a sprue bush 11. At least a part of a sprue flow path 11a, which serves as the supply path of the molding material into the mold apparatus 10, is formed in the sprue bush 11. The movable side base mold 1 is provided with an ejector device (not shown), in which the movable mold plate 4 is removably loaded and held. The ejector device includes an ejector pin or the like for pushing out and releasing the molded product from the movable mold plate 4. The fixed mold plate 5 is loaded and held in the base intermediate mold 3. A runner flow path 12, through which the molding material supplied from the sprue flow path 11a flows, is formed in the fixed mold plate 5. FIG. 1 shows a mold closed state where the fixed mold plate 5 and the movable mold plate 4 are in close contact with each other at a parting surface P, and a cavity space C in which the molded product is formed is formed between the fixed mold plate 5 and the movable mold plate 4. As will be described in detail later, when the cassette mold is a three-plate mold, a runner stripper plate 21 is provided between the fixed side base mold 2 and the fixed mold plate 5. Preferably, a runner locking plate 22 is further provided between the runner stripper plate 21 and the fixed side base mold 2. In other words, the cassette mold of the mold apparatus 10 shown in FIG. 1 to FIG. 4 is a three-plate mold that includes the fixed mold plate 5, the movable mold plate 4, the runner stripper plate 21, and the runner locking plate 22. As shown in FIG. 5 to FIG. 7, when the cassette mold is a three-plate mold, a part of the sprue flow path 11a is formed in the runner stripper plate 21. When the runner locking plate 22 is provided, a part of the sprue flow path 11a is formed in the runner locking plate 22. That is, in the present embodiment, the holes that are formed in the sprue bush 11, the runner stripper plate 21, and the runner locking plate 22 and communicate with each other serve as the sprue flow path 11a. When the cassette mold is a two-plate mold, the sprue flow path 11a formed in the sprue bush 11 directly communicates with the runner flow path 12. Normally, the sprue flow path 11a has a draft angle shape. A space for communicating with the runner flow path 12 to form a cold slug well, which serves as a cold slug pool, may be formed as necessary.

A base intermediate mold driving device 6, which is a pair of fluid pressure cylinders, for example, is fixed to the fixed side base mold 2. The base intermediate mold driving device 6 moves the base intermediate mold 3 and the fixed mold plate 5 in the mold opening/closing direction and positions and fixes them at any position between the fixed side base mold 2 and the movable side base mold 1. That is, the tip of a piston 6a of each base intermediate mold driving device 6 is connected to the base intermediate mold 3, and as these pistons 6a are extended or contracted synchronously with each other, the base intermediate mold 3 moves in the mold opening/closing direction, by which the fixed mold plate 5 moves in the mold opening/closing direction. The base intermediate mold driving device 6 is not limited to a pneumatic or hydraulic fluid pressure cylinder, and various driving devices such as an electric motor, e.g. a motor, may be used.

A guide rod 8 is fixed to the fixed side base mold 2. One end of the guide rod 8 is fixed to the fixed side base mold 2 and the guide rod 8 is disposed to extend from the fixed portion to the side of the movable side base mold 1. The movable side base mold 1 and the base intermediate mold 3 are respectively formed with guide holes 1a and 3a that extend in the mold opening/closing direction, and the guide rod 8 is inserted through the guide hole 1a and the guide hole 3a. Thereby, the movable side base mold 1 and the base intermediate mold 3 can move relatively in the mold opening/closing direction with respect to the fixed side base mold 2 independently of each other.

An injection unit 9 of the molding machine for injecting molten molding material is disposed on the side where the molding material is supplied, that is, the fixed side in the present embodiment. The injection unit 9 melts and plasticizes the molding material and extrudes the molten molding material with an injection shaft of a screw, a plunger or the like to inject it from a nozzle part 20. The molding material injected from the nozzle part 20 is sent to the sprue flow path 11a, passes through the runner flow path 12, and is filled into the cavity space C via a gate G The gate G is a pinpoint gate having an extremely small opening diameter.

As clearly shown in FIG. 5, the runner stripper plate 21 is formed with a through hole 21a that communicates with the runner flow path 12. The through hole 21a penetrates the runner stripper plate 21. The through hole 21a preferably has a draft tapered shape. An inverse tapered space 22a is formed in the runner locking plate 22 that is positioned on the side of the fixed side base mold 2 with respect to the runner stripper plate 21. The inverse tapered space 22a has an inverse tapered shape at least in part and communicates with the through hole 21a on the side of the runner stripper plate 21. The inverse tapered space 22a is provided with a runner locking part in which a locking portion 34 made of the molding material is formed. In the present embodiment, the runner locking part is provided in the runner locking plate 22. The molding material flows from the runner flow path 12 into the inverse tapered space 22a via the through hole 21a to form the locking portion 34 that holds a sprue runner 32. In addition, the aforementioned "inverse tapered shape" indicates that the cross-sectional area of the shape of the inverse tapered space 22a as described above gradually increases from the space end portion on the side communicating with the opening of the through hole 21a (the upper end portion in FIG. 5) toward the end portion on the opposite side (the lower end portion in FIG. 5). The taper angle of the inverse tapered space 22a is 1 degree to 10 degrees, for example. The position and number of the locking portions 34 are not limited as long as the locking portion 34 holds the sprue runner 32. In other words, it suffices if the inverse tapered space 22a communicates with the runner flow path 12 via the through hole 21a. In order to properly hold the sprue runner 32 when detaching the molded product and the sprue runner 32 from each other, it is desirable to dispose the locking portion 34 at a position corresponding to the gate G, that is, substantially coaxially with the gate G in the mold opening/closing direction.

Although the runner locking plate 22 may be constantly fixed to the fixed side base mold 2, it is desirable that a predetermined gap is formed between the fixed side base mold 2 and the runner locking plate 22 during unlocking. As air flows in through the gap, the unlocking becomes easy. In this case, a runner locking plate moving means 23 is provided for moving the runner locking plate 22 in the direction to be away from or into contact with the fixed side base mold 2. The runner locking plate moving means 23 is, for example, a bolt. The head portion of the bolt can be locked to the runner locking plate 22, and the shaft portion of the bolt is inserted through the runner locking plate 22 and the end portion is fixed to the runner stripper plate 21. In this way, when the runner stripper plate 21 moves in the mold opening direction, the runner locking plate moving means 23 presses and moves the runner locking plate 22. According to the configuration as described above, it is not necessary to separately provide a driving device or the like, and the runner locking plate 22 can be moved with a simple configuration, which is preferable. The disclosure is not limited to the above configuration and a cylinder may be disposed to serve as the runner locking plate moving means 23.

Here, a runner unlocking means is provided for moving the runner stripper plate 21 away from the runner locking part to unlock the locking portion 34. The runner unlocking means is specifically a runner stripper plate driving device 7, which is a pair of fluid pressure cylinders, for example. The runner stripper plate driving device 7 is fixed to the fixed side base mold 2. The runner stripper plate 21 is connected to connection members 14 at two side end portions as an example, as shown in FIG. 1 to FIG. 4. The tips of the pistons 7a of the runner stripper plate driving device 7 are respectively connected to these connection members 14. The runner stripper plate driving device 7 moves the runner stripper plate 21 to separate it from the runner locking part when unlocking the locking portion 34. With such a configuration, it is possible to hold the sprue runner 32 without using a runner lock pin, and the flexibility of design of the mold apparatus 10 is improved. The runner stripper plate driving device 7 is not limited to a pneumatic or hydraulic fluid pressure cylinder, and various driving devices such as an electric motor, e.g. a motor, may be used.

Hereinafter, mold opening/closing of the mold apparatus 10 of the present embodiment and a method of taking out the molded product and the sprue runner 32 will be described. FIG. 1 shows the mold apparatus 10 in the mold closed state. In the mold closed state, the base intermediate mold driving device 6 contracts the piston 6a and brings the base intermediate mold 3 into close contact with the fixed side base mold 2. The runner stripper plate driving device 7 also contracts the piston 7a and brings the runner stripper plate 21 and the runner locking plate 22 that are in close contact with each other into close contact with the fixed side base mold 2. The movable side base mold 1 is moved in the mold closing direction by the aforementioned movable platen, and the movable mold plate 4 is brought into close contact with the fixed mold plate 5 at the parting surface P. Particularly, during molding, the movable mold plate 4 and the fixed mold plate 5 are clamped by the movable platen and the fixed platen with a predetermined mold clamping force.

In this state, the molding material is fed from the nozzle part 20 of the injection unit 9 toward the cavity space C through the sprue flow path 11a. As shown in FIG. 5, the molding material passes through the runner flow path 12 and is injected into the cavity space C from the gate G The injected molding material is then cooled and solidified into a molded product.

At this time, the molding material that flows into the sprue flow path 11a and the runner flow path 12 is also cooled and solidified into the sprue runner 32. The molding material also flows into the through hole 21a of the runner stripper plate 21. This molding material flows through the through hole 21a and is sent into the inverse tapered space 22a of the runner locking plate 22. The molding material sent into the inverse tapered space 22a is cooled and solidified into the locking portion 34.

Figure 2:
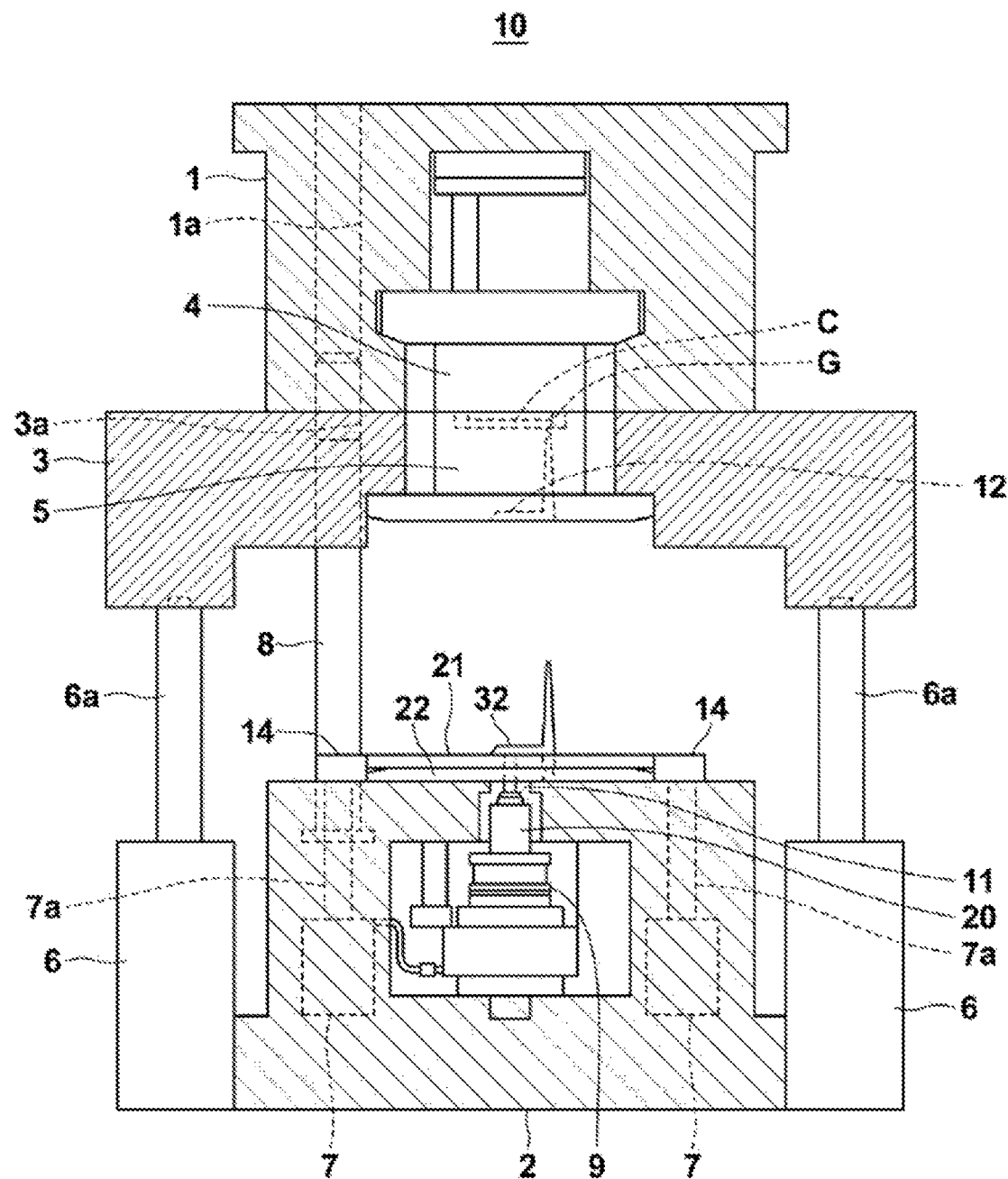
FIG. 2 is a partially cutaway side view showing the mold apparatus of an embodiment in a state where the sprue runner and the molded product are detached.

Next, the mold apparatus 10 takes out the sprue runner 32. First, as shown in FIG. 2, the sprue runner 32 is detached from the molded product at the gate G That is, the movable platen is driven in the mold opening direction and the movable side base mold 1 moves in the mold opening direction. In synchronization with the driving of the movable platen, the base intermediate mold driving device 6 extends the piston 6a and separates the base intermediate mold 3 from the fixed side base mold 2 in a state where the movable mold plate 4 and the fixed mold plate 5 are in close contact with each other at the parting surface P. When the fixed mold plate 5 is separated from the fixed side base mold 2 to a position that allows the sprue runner 32 to be taken out, the base intermediate mold driving device 6 positions and fixes the base intermediate mold 3 in a state where the movable mold plate 4 and the fixed mold plate 5 are in contact with each other. FIG. 6 shows in detail the state of the area around the sprue runner 32 at this time.

When the fixed mold plate 5 is separated from the fixed side base mold 2, the molded product in the cavity space C and the sprue runner 32 are cut at the portion of the gate G. At this time, as shown in FIG. 6, the sprue runner 32 is held on the side of the runner stripper plate 21 and the runner locking plate 22 by the locking portion 34.

Figure 3:
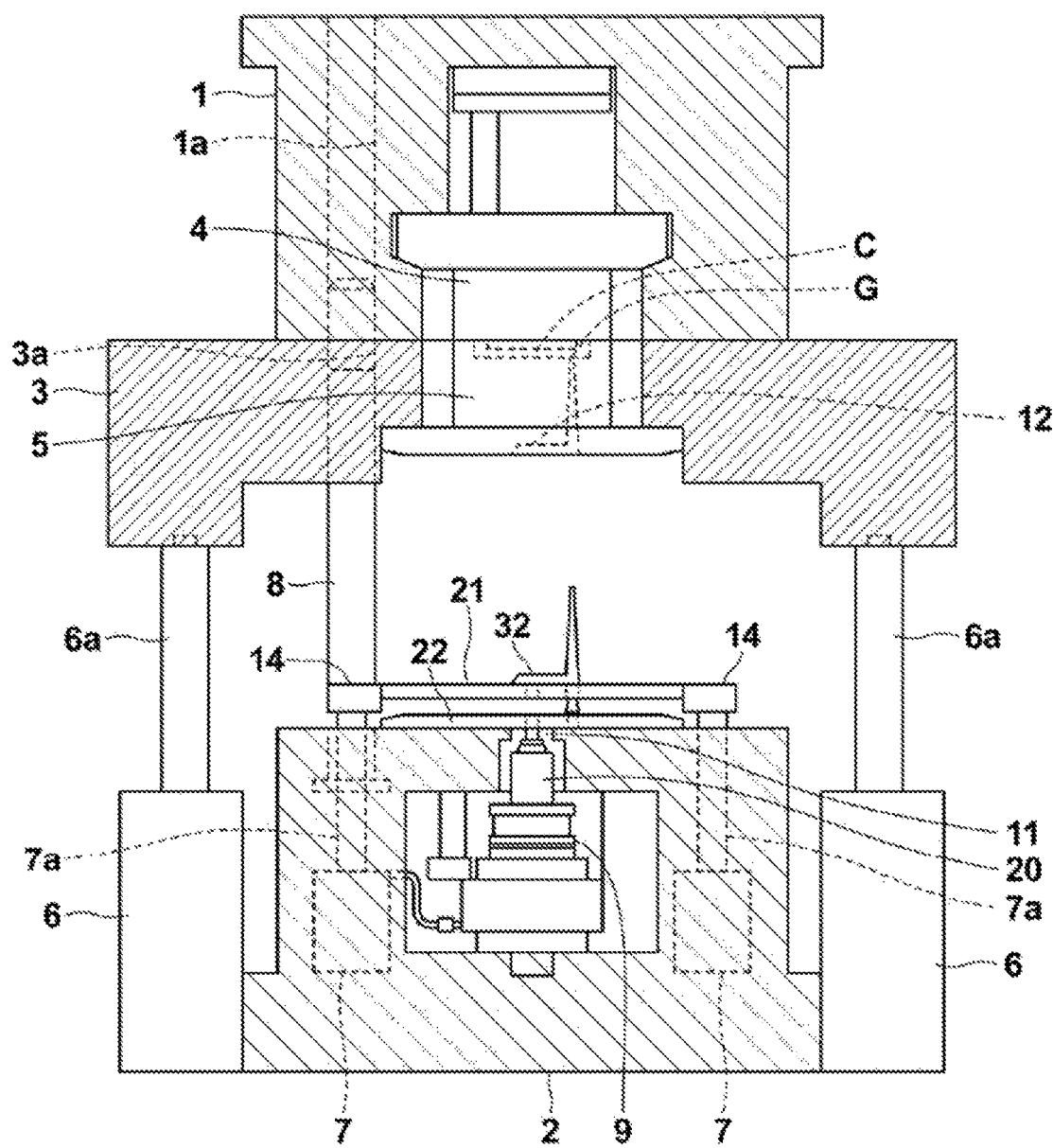
FIG. 3 is a partially cutaway side view showing the mold apparatus of an embodiment in a state where the sprue runner is unlocked.

After the sprue runner 32 is detached from the molded product and the fixed mold plate 5 is separated from the fixed side base mold 2 to a position that allows the sprue runner 32 to be taken out, the mold apparatus 10 unlocks the sprue runner 32 as shown in FIG. 3. That is, the piston 7a of the runner stripper plate driving device 7 is extended to move the runner stripper plate 21 away from the runner locking part via the connection members 14. FIG. 7 shows in detail the state of the area around the sprue runner 32 at this time.

As described above, the runner stripper plate 21 moves to be separated from the runner locking plate 22, so as to disengage the locking portion 34 from the inverse tapered space 22a of the runner locking plate 22. In this way, the sprue runner 32 is released from the locking of the runner locking plate 22. Therefore, the sprue runner 32 can be taken out from the mold apparatus 10 by using a conventional sprue runner take-out robot or the like.

Once the sprue runner 32 is taken out from the mold apparatus 10, the mold apparatus 10 then takes out the molded product. That is, as shown in FIG. 4, the piston 7a of the runner stripper plate driving device 7 is contracted and the runner stripper plate 21 is moved via the connection members 14 to a position to be in contact with the runner locking plate 22. Along with this, the piston 6a of the base intermediate mold driving device 6 is contracted and the base intermediate mold 3 is moved to a position to be in contact with the fixed side base mold 2. In other words, the base intermediate mold 3 is positioned and fixed so that the fixed mold plate 5 and the fixed side base mold 2 are in contact with each other. At this time, the parting surface P between the movable mold plate 4 and the fixed mold plate 5 is opened. Then, the molded product is released by the ejector device (not shown), and the molded product is taken out from the mold apparatus 10 by using a conventional molded product take-out robot or the like.

After the molded product is taken out as described above, the movable side base mold 1 is moved in the mold closing direction by the movable platen, and the mold apparatus 10 returns to the mold closed state shown in FIG. 1 to be prepared for molding the next molded product. The driving of the movable platen is controlled by a controller of the molding machine (not shown). The driving of the base intermediate mold driving device 6 and the runner stripper plate driving device 7 may also be performed by the controller of the molding machine or may be performed by an individual controller 15.

As described above, by taking out the sprue runner 32 in a state where the fixed mold plate 5 and the movable mold plate 4 are in contact with each other and taking out the molded product in a state where the fixed mold plate 5 and the fixed side base mold 2 are in contact with each other, it is possible to save the degree of mold opening of the mold apparatus 10 loaded with the cassette mold which is a three-plate mold. Thus, it is possible to load and use a relatively large three-plate cassette mold.

In addition, although the cassette mold of the mold apparatus 10 of the above embodiment is a three-plate mold, it may also be a two-plate mold. In that case, when the molded product and the sprue runner 32 are taken out, the base intermediate mold driving device 6 positions and fixes the base intermediate mold 3 so that the fixed mold plate 5 and the fixed side base mold 2 are in contact with each other. That is, after operating the movable platen in the mold opening direction to bring the movable mold plate 4 and the fixed mold plate 5 apart from each other in the state where the fixed mold plate 5 and the fixed side base mold 2 are fixed, and taking out the molded product and the sprue runner 32 from the parting surface P, the movable platen is operated in the mold closing direction to close the mold.

Figure 8:
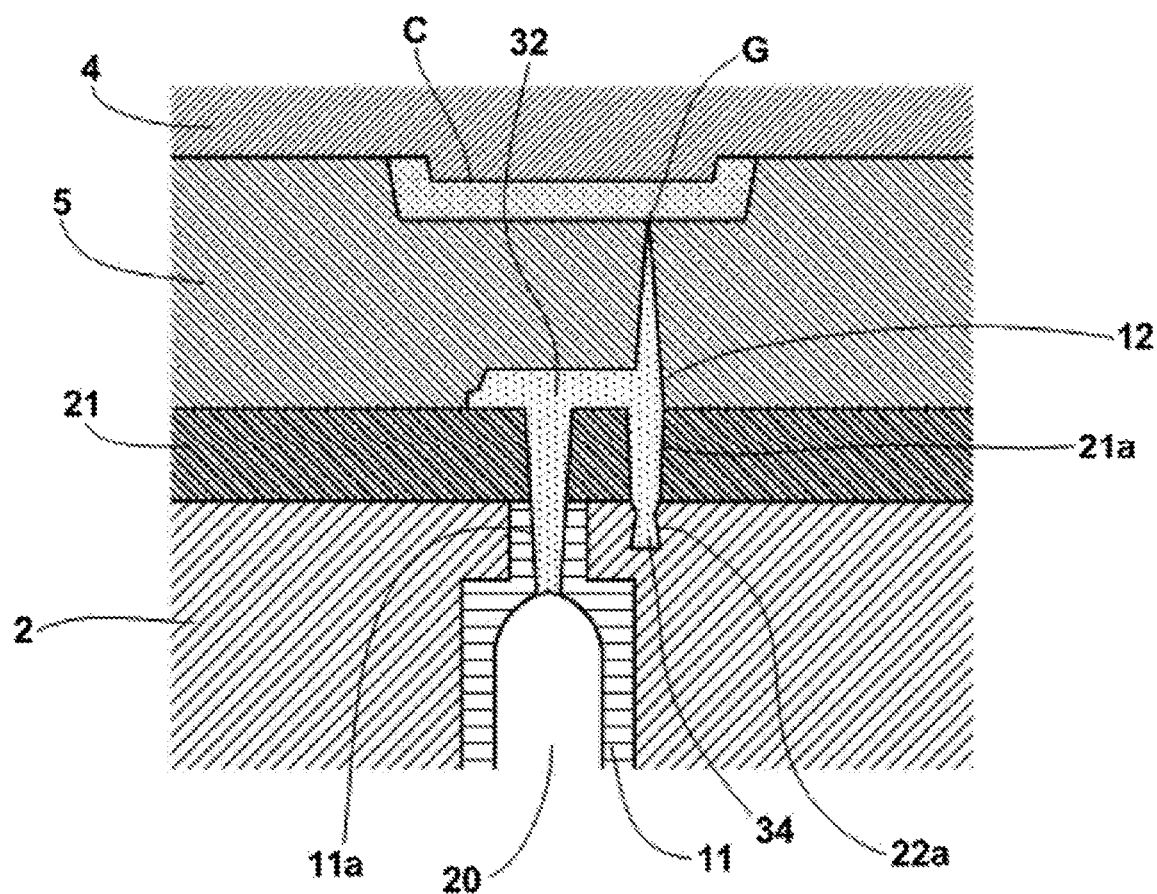
FIG. 8 is an enlarged side cross-sectional view of the area around the sprue runner, which shows a modified example of the runner locking part.

Although the runner locking plate 22 is provided between the fixed side base mold 2 and the runner stripper plate 21, and the runner locking part is formed in the runner locking plate 22 in the present embodiment, the runner locking part may be formed in the fixed side base mold 2 as shown in FIG. 8. Nevertheless, it is more preferable to form the runner locking part in the runner locking plate 22, that is, to form the inverse tapered space 22a in the runner locking plate 22 for it is easy to manufacture.

In the present embodiment, the runner stripper plate driving device 7 is provided as the runner unlocking means for moving the runner stripper plate 21 away from the runner locking part to unlock the locking portion 34. However, the runner unlocking means may be in other forms. The runner unlocking means may be configured to include a tension link, a puller bolt, and a stop bolt, for example. The tension link connects the fixed mold plate 5 and the movable mold plate 4 to limit the degree of opening between the fixed mold plate 5 and the movable mold plate 4. The head portion of the puller bolt can lock the fixed mold plate 5. The head portion of the stop bolt can lock the fixed side base mold 2. The runner stripper plate 21 is interposed between and connected with an end portion of the puller bolt and an end portion of the stop bolt. With such a configuration, if the movable platen is further operated in the mold opening direction after the degree of opening between the fixed mold plate 5 and the movable mold plate 4 reaches a predetermined value, the fixed mold plate 5 is pulled out in the mold opening direction by the tension link, and then the runner stripper plate 21 is moved via the puller bolt to be separated from the runner locking part. In this way, the locking portion 34 is disengaged from the inverse tapered space 22a of the runner locking plate 22. The movement stroke of the runner stripper plate 21 is limited by the stop bolt.

The mold apparatus 10 of the disclosure can be mounted on a molding machine such as an injection molding machine, and the mold clamping device of the molding machine may be horizontal type or vertical type. Further, in the mold apparatus 10 of the present embodiment, the side where the molding material is supplied is configured as the fixed side, but the side where the molding material is supplied may be configured as the movable side. In other words, the first base mold may correspond to the movable side base mold 1, the first mold plate may correspond to the movable mold plate 4, the second base mold may correspond to the fixed side base mold 2, and the second mold plate may correspond to the fixed mold plate 5. That is, the mold apparatus may include a movable side base mold, a sprue bush provided in the movable side base mold and formed with at least a part of a sprue flow path to which a molding material is supplied, a movable mold plate formed with a runner flow path through which the molding material supplied from the sprue flow path flows, a base intermediate mold loaded with the movable mold plate, a fixed mold plate, a fixed side base mold loaded with the fixed mold plate, and a base intermediate mold driving device positioning and fixing the base intermediate mold at any position between the movable side base mold and the fixed side base mold. The mold apparatus may be configured so that the movable base mold moves in the mold opening/closing direction with respect to the fixed base mold to bring the movable mold plate and the fixed mold plate into contact to form a cavity space for molding a molded product, and the molding material sent from the sprue and runner flow paths is filled into the cavity space via a gate.

The embodiment was chosen in order to explain the principles of the disclosure and its practical application. Many modifications and variations are possible in light of the above teachings. It is intended that the scope of the disclosure be defined by the claims.

What is claimed is:

1. A mold apparatus, at least comprising:
   a first base mold;
   a sprue bush provided in the first base mold and formed with at least a part of a sprue flow path to which a molding material is supplied;
   a first mold plate formed with a runner flow path through which the molding material supplied from the sprue flow path flows, a gate through which the molding material supplied from the runner flow path flows, and a part of a cavity space which is filled with the molding material supplied from the gate and in which a molded product is molded;
   a base intermediate mold loaded with the first mold plate;
   a second mold plate formed with a part of the cavity space;
   a second base mold loaded with the second mold plate and relatively moving in a mold opening/closing direction with respect to the first base mold;
   a base intermediate mold driving device positioning and fixing the base intermediate mold at any position between the first base mold and the second base mold; and
   a controller controlling the base intermediate mold driving device, wherein
   when a loaded cassette mold is a two-plate mold, the cassette mold comprises the first mold plate and the second mold plate;
   when the cassette mold is a three-plate mold, the cassette mold comprises the first mold plate, the second mold plate, and further comprises a runner stripper plate, the runner stripper plate provided between the first mold plate and the first base mold;
   when the cassette mold is a two-plate mold, the controller controls the base intermediate mold driving device to position and fix the base intermediate mold so that the first mold plate and the first base mold are in contact with each other;
   when the cassette mold is a three-plate mold, the controller controls the base intermediate mold driving device to position and fix the base intermediate mold so that the first mold plate and the second mold plate are in contact with each other when a sprue runner formed in the sprue flow path and the runner flow path is taken out, and the controller controls the base intermediate mold driving device to position and fix the base intermediate mold so that the first mold plate and the first base mold are in contact with each other when the molded product is taken out.

2. The mold apparatus according to claim 1, wherein the runner stripper plate has a through hole that communicates with the runner flow path, and the mold apparatus further comprises:
- a runner locking part formed with an inverse tapered space which communicates with the through hole on the side of the first base mold and has an inverse tapered shape, wherein a locking portion made of the molding material is formed in the inverse tapered space; and
- a runner unlocking means moving the runner stripper plate away from the runner locking part to unlock the locking portion.

3. The mold apparatus according to claim 2, further comprising a runner locking plate provided between the first base mold and the runner stripper plate when the cassette mold is a three-mold plate, wherein the runner locking part is provided in the runner locking plate.

4. The mold apparatus according to claim 3, further comprising a runner locking plate moving means moving the runner locking plate in a mold opening direction to form a predetermined gap between the first base mold and the runner locking plate.

5. The mold apparatus according to claim 2, wherein the runner locking part is provided in the first base mold.

6. The mold apparatus according to claim 2, wherein the runner unlocking means comprises a runner stripper plate driving device that moves the runner stripper plate in a mold opening direction.

7. The mold apparatus according to claim 2, wherein the runner unlocking means comprises:
- a tension link connecting the first mold plate and the second mold plate to limit a degree of opening between the first mold plate and the second mold plate;
- a puller bolt having a head portion for locking the first mold plate; and
- a stop bolt having a head portion for locking the first base mold,
- wherein the runner stripper plate is interposed between and connected with an end portion of the puller bolt and an end portion of the stop bolt.

* * * * *